US010021826B2

(12) United States Patent
Meyer et al.

(10) Patent No.: US 10,021,826 B2
(45) Date of Patent: Jul. 17, 2018

(54) AIR STREAM SELECTOR FOR AN AIR DRILL SEEDING SYSTEM

(71) Applicant: ONE PASS IMPLEMENTS INC., Langbank (CA)

(72) Inventors: Andrew Thomas Meyer, Wawota (CA); Robert John Higgins, Whitewood (CA); Jeffrey Cameron Pridmore, Saskatoon (CA); Justin Charles Varjassy, Langbank (CA)

(73) Assignee: ONE PASS IMPLEMENTS INC., Langbank (CA)

( * ) Notice: Subject to any disclaimer, the term of this patent is extended or adjusted under 35 U.S.C. 154(b) by 146 days.

(21) Appl. No.: 14/431,255

(22) PCT Filed: Sep. 26, 2013

(86) PCT No.: PCT/CA2013/050734
§ 371 (c)(1),
(2) Date: Mar. 25, 2015

(87) PCT Pub. No.: WO2014/047735
PCT Pub. Date: Apr. 3, 2014

(65) Prior Publication Data
US 2015/0257332 A1   Sep. 17, 2015

Related U.S. Application Data

(60) Provisional application No. 61/705,962, filed on Sep. 26, 2012.

(51) Int. Cl.
*B65G 53/40* (2006.01)
*A01C 7/08* (2006.01)

(52) U.S. Cl.
CPC ............. *A01C 7/084* (2013.01); *A01C 7/081* (2013.01); *Y02P 60/16* (2015.11)

(58) Field of Classification Search
CPC ........ A01C 7/084; B65G 53/04; B65G 53/40; B65G 53/528; B65G 53/52
(Continued)

(56) References Cited

U.S. PATENT DOCUMENTS

| 4,779,765 | A | 10/1988 | Neumeyer |
| 6,834,599 | B1 | 12/2004 | Fuessel et al. |

(Continued)

FOREIGN PATENT DOCUMENTS

| CA | 2242044 | 1/2000 |
| EP | 2353355 | 8/2011 |
| EP | 2353357 | 8/2011 |

OTHER PUBLICATIONS

PCT International Search Report of PCT/CA2013/050734, dated Dec. 4, 2013.

*Primary Examiner* — Joseph Dillon, Jr.
(74) *Attorney, Agent, or Firm* — Bennett Jones LLP (57) ABSTRACT

A collector/distribution assembly is provided for use with a product supply tank having a bottom outlet, comprising a housing having a front wall, a back wall and two side walls, said housing having an open top for receiving product from the bottom outlet of the product supply tank, an open bottom and at least one pair of side by side loading zones comprising a left loading zone and a right loading zone; a number of left pneumatic conveying lines for receiving air, each left pneumatic conveying line operably associated with a corresponding left loading zone to allow air to pass into, through and out of the left loading zone; a number of right pneumatic conveying lines for receiving air, each right pneumatic conveying line operably associated with a corresponding right loading zone to allow air to pass into, through and out of the right loading zone; and at least one air stream selector device comprising a shaped diverter operable to be positioned at the bottom of the housing; whereby when the at (Continued)

least one air stream selector device is positioned at the bottom of the housing, the device closes off either the right loading zone or the left loading zone of one pair of side by side loading zones thereby diverting product to the other of the right loading zone or the left loading zone.

8 Claims, 5 Drawing Sheets

(58) Field of Classification Search
USPC .................................. 406/181, 183, 192
See application file for complete search history.

(56) References Cited

U.S. PATENT DOCUMENTS

| | | | |
|---|---|---|---|
| 7,743,927 B2* | 6/2010 | Svatek | B07C 5/02 |
| | | | 193/25 FT |
| 8,001,915 B2 | 8/2011 | Friggstad | |
| 8,522,948 B1* | 9/2013 | Galvin, IV | B65G 11/026 |
| | | | 193/10 |
| 8,858,062 B2* | 10/2014 | Guthrie | B05B 1/20 |
| | | | 193/10 |
| 2004/0182673 A1* | 9/2004 | Baller | B65G 11/166 |
| | | | 193/32 |
| 2007/0163858 A1* | 7/2007 | Leitner | E01H 5/00 |
| | | | 193/3 |
| 2007/0289846 A1* | 12/2007 | Bohnker | B65G 15/16 |
| | | | 198/468.2 |
| 2009/0314191 A1 | 12/2009 | Friggstad | |
| 2016/0122127 A1* | 5/2016 | Ruge | B65D 11/02 |
| | | | 211/15 |

* cited by examiner

AIR STREAM SELECTOR FOR AN AIR DRILL SEEDING SYSTEM

FIELD OF THE INVENTION

The present invention relates generally to the field of multi-compartment air seeding systems, where the compartments can be used to selectively supply different agricultural materials to specific metering assemblies and air streams based on volume considerations and crop requirements. More particularly, the present invention is directed to an improved collector/distribution assembly comprising an air stream selector device for selectively diverting material to one air stream or another.

BACKGROUND OF THE INVENTION

In many agricultural applications, different particulate materials such as seed, fertilizer, inoculates and other seed treatments are applied to a field in controlled amounts at simultaneous or different times. Strictly controlled rates of application are often critical to optimize crop yield and to efficiently make use of the applied particulate material. To apply these types of agricultural particulate materials in controlled amounts, conventional systems are generally comprised of a tank for containing the particulate material, and a metering device. In these systems, the metering device receives the particulate material from the tank, and meters and delivers this material at a controlled rate to the soil.

Air seeders are commonly used to apply agricultural particulate material and are often comprised of a wheeled or tracked seed cart that includes one or more frame-mounted tanks for holding seed or fertilizer or both. This type of seeder also generally comprises a metering system used to dispense particulate material from the tanks and a pneumatic distribution system for delivering the products from the tanks to the soil.

Several different types of air seeders are available, including double shoot air seeders and triple shoot air seeders. Double shoot air seeders are often used to deposit both fertilizer and seed into the soil in a single pass. Generally, double shoot air seeders comprise a collector/distribution assembly positioned below each product tank (i.e., seed tank and fertilizer tank), each collector/distribution assembly having at least a pair of vertically spaced loading zones, i.e., an upper loading zone and a lower loading zone. Each loading zone has its own air stream passing transversely therethrough for delivering either the seed or the fertilizer to the furrowing elements. The furrowing elements are generally arranged to deposit the seed and fertilizer into the ground at slightly different locations, to prevent too much fertilizer from being in contact with the seed in the early stages of seed growth.

Generally, a diverter mechanism is used to dictate which loading zone will be in use, i.e., which loading zone will be open and which loading zone will be closed. In U.S. Pat. No. 6,834,599, the diverter mechanism comprises a series of diverter flaps that are actuated with an externally mounted handle. In U.S. Pat. No. 6,283,679, the diverter mechanism comprises a horizontally adjustable slide having two positions to divert product into either an upper or lower receiving air stream.

However, the aforementioned designs either require a complex multitude of diverter valves with a complex linkage between valves so that all can be adjusted at once or a slide mechanism which may result in only partial coverage of a particular loading zone. It is also important for a farmer to be able to completely close off one air stream when metering into the other, to avoid unwanted mixing of products in the air streams. Thus, when using a multitude of diverter valves, they all must be aligned properly and linkages adjusted and set carefully in order to ensure that one air stream is sealed off from the other.

Also, with the prior art diverter designs, there is a tendency to have air leaking between air streams due to the difficulty of getting the internal flaps set properly. Thus, there is a need for a diverter system that will maintain isolation between the pairs of air distribution systems and accomplish true separation of the air streams.

Furthermore, the collector/distribution assemblies described in the prior art generally require a separate element (e.g., clean out floor 70 of U.S. Pat. No. 6,834,599), which needs to be removed for clean out of the collector/distribution assembly. The present invention combines selection and clean out in a single selector device which is simple to operate and avoids unwanted mixing.

SUMMARY OF THE INVENTION

The present invention may be used in a variety of air seeding systems and is particularly useful for systems having a plurality of product supply tanks useful for holding products such as such as seed, fertilizer, inoculates and other seed treatments. In this embodiment, each product supply tank will have a collector/distribution assembly, which assembly is generally positioned beneath each supply tank, for collecting product from the tank and distributing product through one air stream or another. It is understood, however, that a single tank having a plurality of separate compartments, which can be of the same or different size, and each compartment can contain a variety of agricultural particulate material such as seed, fertilizer, inoculates or other seed treatments, can also be used. In this embodiment, a collector/distribution assembly would be positioned beneath each tank compartment. The air seeding system can take the form of a cart that can be towed by a variety of agricultural vehicles such as a tractor.

The present invention discloses a selector device for use with a collector/distribution assembly comprising a housing having an open top and an open bottom and comprising at least one pair of loading zones, each loading zone having an air stream passing transversely therethrough, for delivering product to a seeding apparatus comprising a plurality of furrowing elements, typically seed knives and fertilizer knives, for depositing seed and/or fertilizer into the soil. In one embodiment, the at least one pair of loading zones are substantially side by side, thereby comprising a right loading zone and a left loading zone. The selector device comprises a shaped diverter which can be positioned at the bottom of the housing to close off one of the at least one pair of loading zones thereby diverting product to the other of the pair of loading zones. The selector device thus acts to both seal the bottom of the collector/distribution assembly as well as to divert product to one loading zone or the other. The simplicity of the design allows for consistent separation of the air streams due to the fact that there are no moving parts.

Thus, in one aspect, an air stream selector device for use in a collector/distribution assembly, the collector/distribution assembling having at least one section, the at least one section having a top and a bottom and a pair of side by to side loading zones, a left loading zone and a right loading zone, and the at least one section operable to receive a product from a product supply tank into the left loading zone and the right loading zone and distribute the product to an air seeder, is provided, the air stream selector device comprising:
- a first side wall and a second side wall; and
- a shaped diverter positioned between the first and second side walls;
- wherein the air stream selector device is adapted to be operably attached to the bottom of an individual section and the shaped diverter is shaped to prevent product from collecting in either the right loading zone or the left loading zone of the individual section, whereby when the air stream selector device is attached to the bottom of the individual section in a first orientation, it prevents product from collecting in the right loading zone and when the air stream selector device is attached to the bottom of the individual section in a second orientation, it prevents product from collecting in the left loading zone.

In another aspect, a collector/distribution assembly is provided for use with a product supply tank having a bottom outlet, comprising:
- a housing having a front wall, a back wall and two side walls, said housing having an open top for receiving product from the bottom outlet of the product supply tank, an open bottom and at least one pair of side by side loading zones comprising a left loading zone and a right loading zone;
- a number of left pneumatic conveying lines for receiving air, each left pneumatic conveying line operably associated with a corresponding left loading zone to allow air to pass into, through and out of the left loading zone;
- a number of right pneumatic conveying lines for receiving air, each right pneumatic conveying line operably associated with a corresponding right loading zone to allow air to pass into, through and out of the right loading zone; and
- at least one air stream selector device comprising a shaped diverter operable to be positioned at the bottom of the housing;
- whereby when the at least one air stream selector device is positioned at the bottom of the housing, the device closes off either the right loading zone or the left loading zone of the at least one pair of side by side loading zones thereby diverting product to the other of the right loading zone or the left loading zone.

In one embodiment, when the air stream selector device is positioned at the bottom of the housing in one orientation, the right loading zone is closed off and when the air stream selector device is positioned at the bottom of the housing in the opposite orientation, the left loading zone is closed off. Thus, depending on the orientation of the air stream selector device, product is directed either to an air stream in a left pneumatic conveying line or to an air stream in a right pneumatic conveying line. The selected pneumatic conveying lines then deliver the product such as seeds or fertilizer to the appropriate furrowing elements for inserting the product into the soil.

In one embodiment, the air stream selector device also serves to seal off the bottom of the collector/distributing assembly to prevent loss of product therethrough. In another embodiment, the removal of the air stream selector device allows the clean out of the collector/distributing assembly.

In one embodiment, there is a separate air stream selector device for each pair of side by side loading zones. In another embodiment, a number of air stream selector devices corresponding to the same number of side by side loading zones are connected to one another to operate as a single air stream selector device. In one embodiment, a number of air stream selector devices are positioned side by side on a clean out floor so that the air stream selector devices operate as a single air stream selector device and a clean out floor.

The ability to reverse the air stream selector device provides for greater flexibility in making use of a product holding tank on a seeding system. For example, in one application, the tank (or compartment) may be used to contain and deliver seed, whereas, in another application, this tank (or compartment) may be used to contain and deliver fertilizer.

BRIEF DESCRIPTION OF THE DRAWINGS

The present invention, both as to its organization and manner of operation, may best be understood by reference to the following description, and the accompanying drawings wherein like reference numerals are used throughout the several views, and in which.

DETAILED DESCRIPTION

The detailed description set forth below in connection with the appended drawings is intended as a description of various embodiments of the present invention and is not intended to represent the only embodiments contemplated by the inventors. The detailed description includes specific details for the purpose of providing a comprehensive understanding of the present invention. However, it will be apparent to those skilled in the art that the present invention may be practiced without these specific details.

Figure 1:
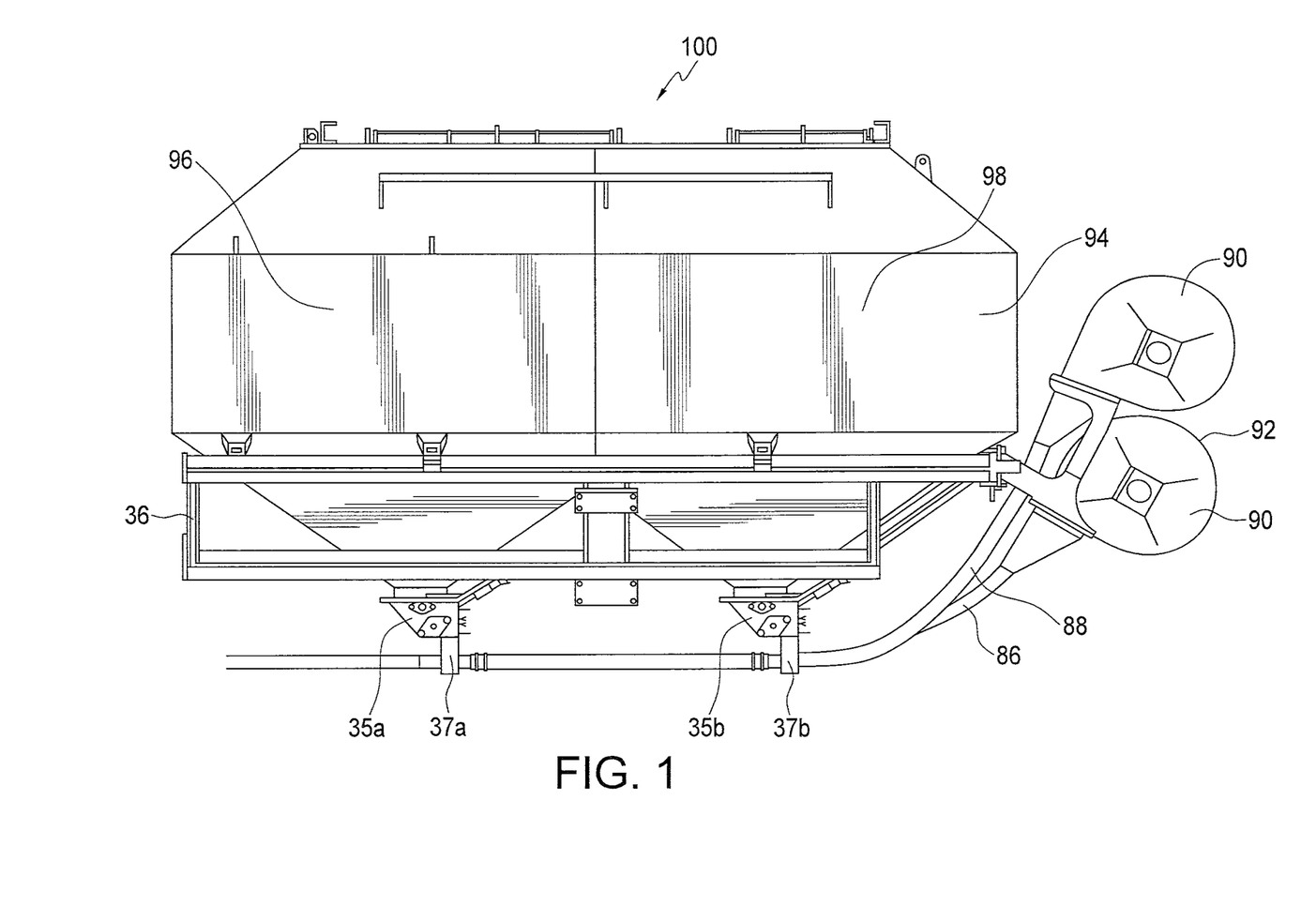
FIG. 1 is a perspective view of a multi-compartment air seeding system equipped with two collector/distribution assemblies of the present invention.

FIG. 1 illustrates an air seeding system 100 comprising a dual material tank 94 having two separate compartments, 96 and 98, for holding two separate products, e.g., particulate materials such as seed or fertilizer. The dual material tank 94 is carried by a frame 36, which can adopt a wide variety of different configurations, so that the air seeding system 100 can be pulled or towed by a variety of different agricultural vehicles such as a tractor. By way of example, compartment 96 may be filled with particulate fertilizer and compartment 98 may be filled with seed. This is a common configuration when using a single pass of the air seeding system to both seed and fertilize.

As further shown in FIG. 1, each compartment 96 and 98 is fitted with its own collector/distribution assembly, 37a and 37b, respectively, whereby, in this example, collector/distribution assembly, 37a and 37b further comprise metering devices 35a and 35b, respectively. For example, collector/distribution assembly 37a may be dispensing fertilizer and collector/distribution assembly 35b may be dispensing seed. Compartments 96 and 98 can be tapered downward to help direct the material into their respective collector/distribution assemblies, 37a and 37b. The material can first enter metering assemblies 35a and 35b by gravity to be metered before distribution.

The air seeding system 100 further comprises a pneumatic distribution system 92 comprising a plurality of high capacity fans 90 which direct air through a plurality of pipes or conduits, often referred to as primary distribution lines, each of which is operably connected to both collector/distribution assembly 37a and 37b. FIG. 1 only shows two primary distribution lines, pneumatic conveying lines 86 and 88, however, it is understood that the number of pneumatic conveying lines will depend on the size and configuration of the collector/distribution assemblies.

Figure 2:
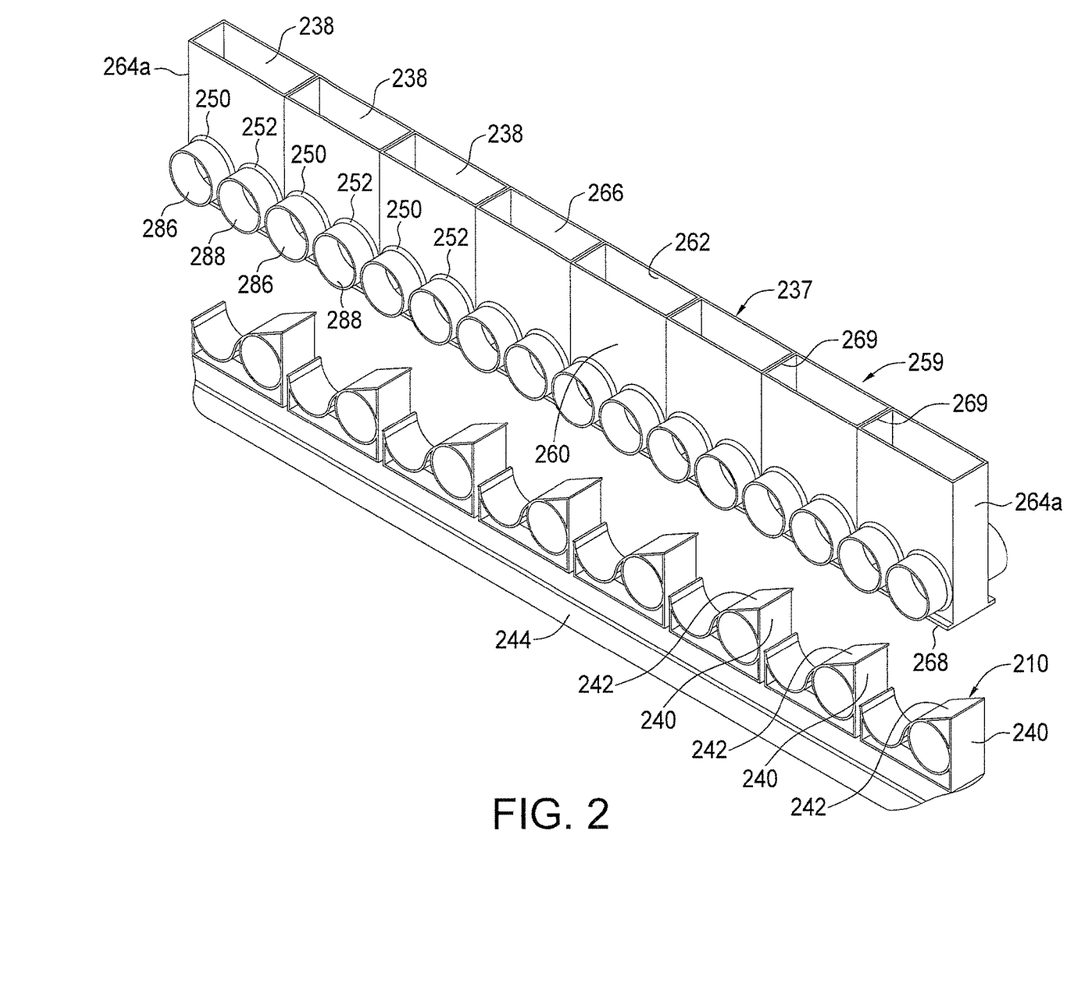
FIG. 2 is an isometric view of a collector/distribution assembly of the present invention having eight pairs of side by side loading zones and having one embodiment of an air stream selector device of the present invention.

FIG. 2 is an isometric view of an embodiment of an eight section collector/distribution assembly 237 and one embodiment of an air stream selector assembly 210 of the present invention. Collector/distribution assembly 237 comprises a housing 259 having a front wall 260, a back wall 262, two side walls, 264a and 264b, an open top 266 and an open bottom 268. Inner dividing walls 269 form the eight sections 238.

Each section 238 of collector/distribution assembly 237 comprises a left loading zone 250 and a right loading zone 252, positioned side by side. Section 238 is also referred to as a pair of side by side loading zones. Each loading zone 250, 252 further comprises a pneumatic conveying line for receiving air. For example, left loading zone 250 comprises left pneumatic conveying line 286 and right loading zone 252 comprises right pneumatic conveying line 288. It can be appreciated that pneumatic conveying lines are generally comprised of discontinuous tubing so as to be operably engaged with each of the collector/distribution assemblies.

Air stream selector assembly 210 (which is shown in FIG. 2 as being removed from the collector/distribution assembly 237) comprises a number of air stream selector devices 240, each device having a shaped diverter 242 that is shaped such that, when the air stream selector assembly 210 is positioned onto the bottom 268 of the housing 259, the right loading zones 252 are blocked off in such a fashion that product is prevented from being conveyed through the right pneumatic conveying lines 288 of the right loadings zones 252. Thus, product is directed to the left loading zones 250 and through left pneumatic conveying lines 286. In this embodiment, the shaped diverter comprises a substantially U-shaped valley at one end (e.g., left end) and a curved upward slope at the other end (e.g., right end). The U-shaped valley helps to collect the product in the left loading zone for distribution through the left pneumatic conveying lines 286 and the curved upward slope directs product away from the right loading zone and into the U-shaped valley. In one embodiment, the number of air stream selector devices are positioned on a clean out floor 244 so that the air stream selector assembly 210 can act as both a diverter and a clean out assembly.

As shown in FIG. 2, air stream selector assembly 210 is oriented such that the shaped diverters 242 prevent flow from the right loading zones 252 to the right pneumatic conveying lines 288. However, in the opposite orientation (i.e., reversed) the shaped diverters 242 prevent flow from the left loading zones 250 to the left pneumatic conveying lines 286. This can be seen more clearly in FIGS. 3 and 4. Thus, in one embodiment, air stream diverter assembly 210 is designed so that it can be oriented in a first position (as shown in FIG. 2) so that the right loading zones are blocked or can be inserted in a second position whereby the left loading zones are blocked. However, it is understood that an operator could have two separate air stream selector assemblies, one for blocking right loading zones and one for blocking left loading zones.

Figure 3:
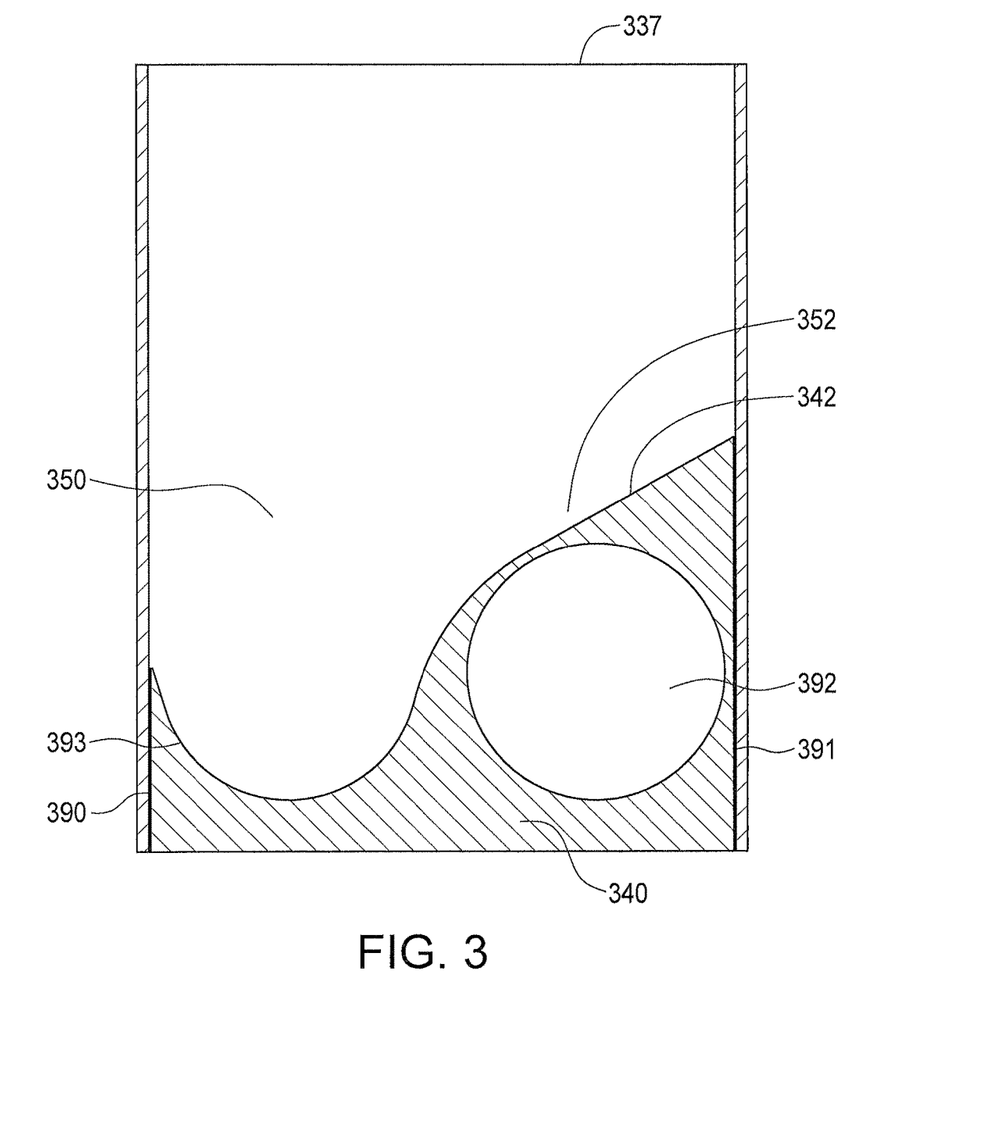
FIG. 3 is a cut away of a collector/distribution assembly comprising only one pair of side by side loading zones having an air stream selector device inserted in one orientation.

FIG. 3 is a cut away of a collector/distribution assembly 337 comprising only one pair of loading zones, left loading zone 350 and right loading zone 352. The air stream selector device 340 in this embodiment comprises a first side wall 390, a second side wall 391, and a shaped diverter 342 positioned between the two side walls, said shaped diverter sized to, in one orientation, prevent the collection of a product in the right loading zone and, in the opposite orientation, prevent the collection of a product in the left loading zone.

Figure 4:
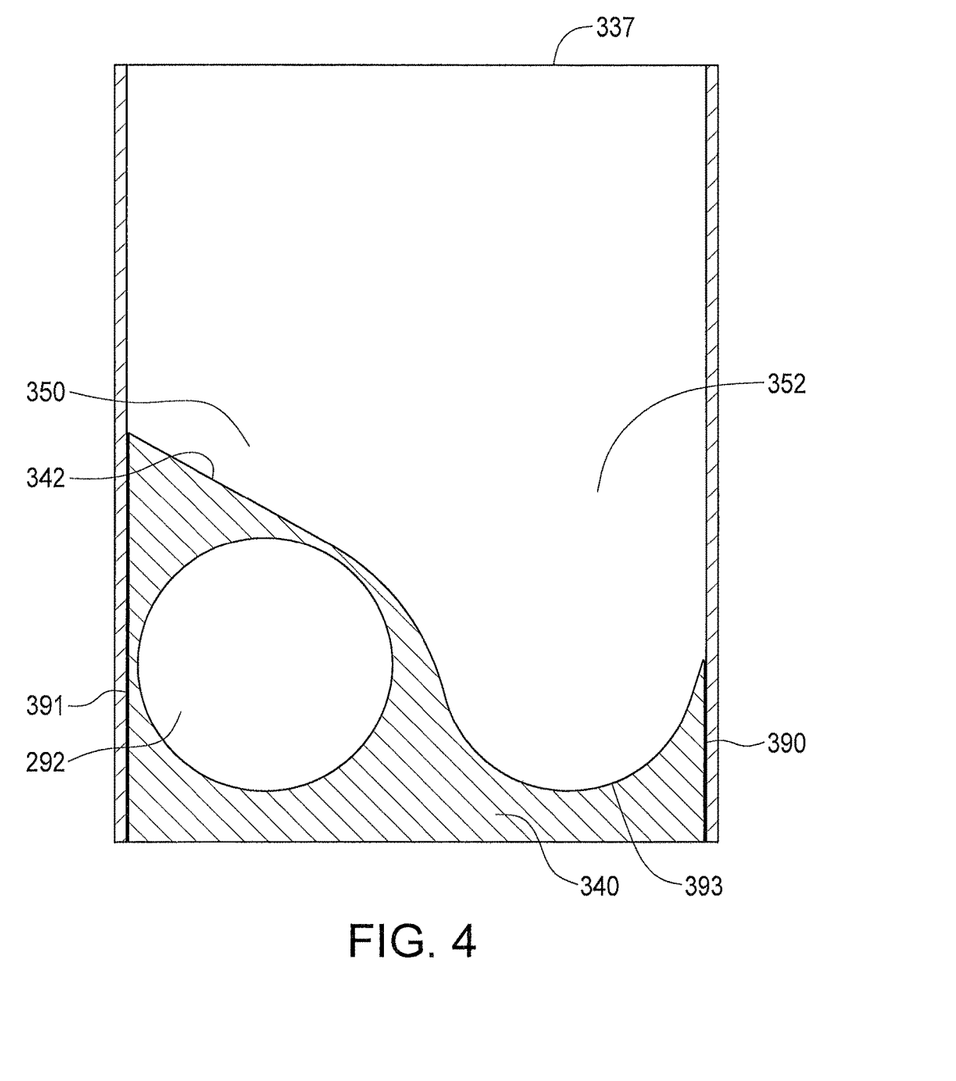
FIG. 4 is a cut away of a collector/distribution assembly comprising only one pair of side by side loading zones having an air stream selector device inserted in the opposite orientation of FIG. 3.

In one embodiment, the air stream selector device is a substantially unitary body, whereby a substantially tubular cavity 392 having a diameter of similar or same dimensions as the inner diameter of the pneumatic conveying lines is formed therethrough, beneath the curved upward slope of diverter 342 to allow a second product (or air) to be dispensed therethrough from a second product tank which has its own collector/distribution assembly attached thereto. In this embodiment, the shaped diverter 342 is shaped so that it also forms a U-shaped valley 393 opposite cavity 392. This allows product being dispensed from collector/distribution assembly 337 to flow more readily to and through the corresponding pneumatic conveying line and therefore there is less chance of product accumulating in corners or crevices. In the orientation shown in FIG. 3, the air stream selector device 342 fits onto the bottom of collector/distribution assembly 337 such that the right loading zone 352 is blocked and therefore product in collector/distribution assembly 337 is prevented from being carried through the corresponding right pneumatic conveying line (not shown). In the reverse orientation, as shown in FIG. 4, air stream selector device 340 fits onto the bottom of collector/distribution assembly 337 such that the left loading zone 350 is blocked and therefore product in collector/distribution assembly 337 is prevented from being carried through the corresponding left pneumatic conveying line (not shown).

Figures 5A, 5B:
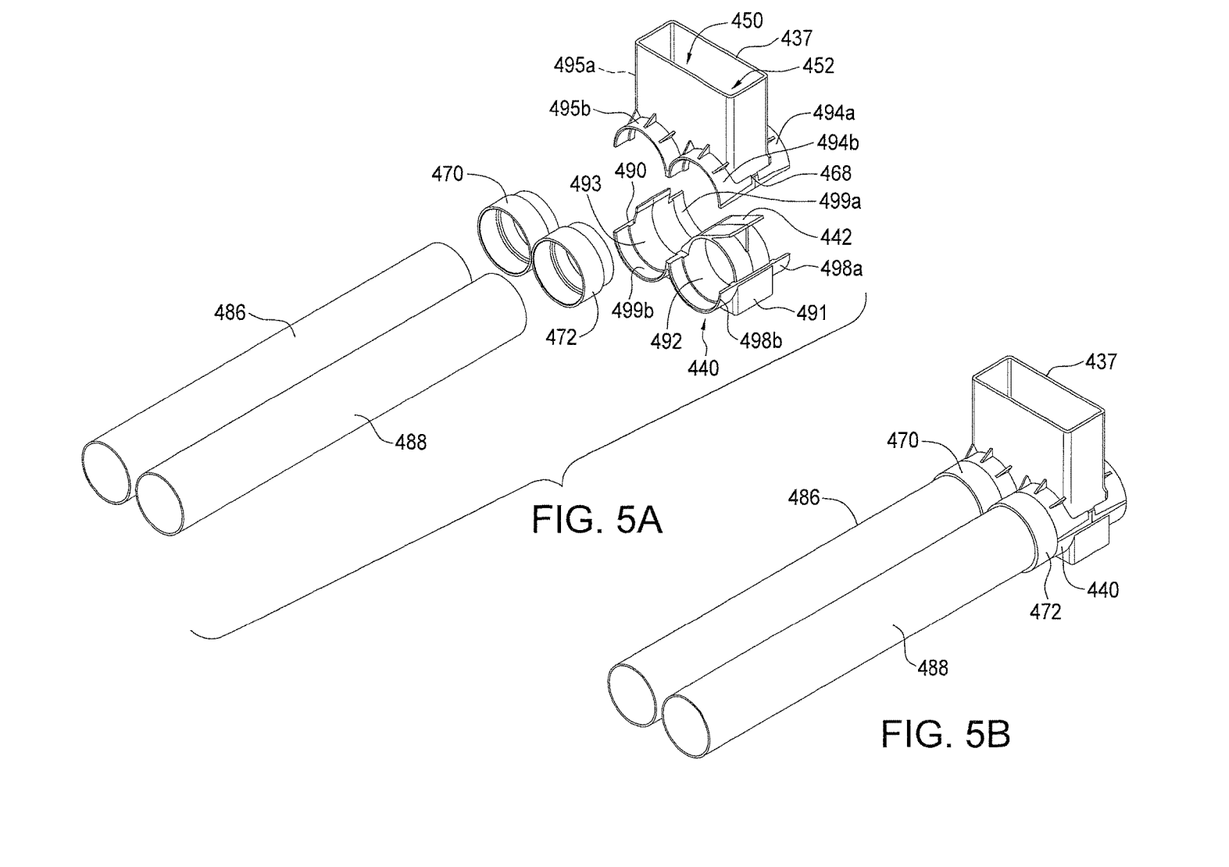
FIG. 5A is isometric views of another embodiment of a collector/distribution assembly comprising only one pair of side by side loading zones and another embodiment of an air stream selector device which attaches to the bottom of the collector/distribution assembly.
FIG. 5B is isometric views of an assembled collector/distribution assembly and air stream selector device of FIG. 5A.

In another embodiment of the present invention, shown in FIG. 5A and FIG. 5B, collector/distribution assembly 437 also comprising only one pair of loading zones, left loading zone 450 and right loading zone 452. The bottom 468 of collector/distribution assembly 437 is fitted with four curved extensions or lips; lips 494a/494b fitted to the right side at the rear and front of the collector/distribution assembly 437, respectively, and lips 495a/495b fitted to the left side at the rear and front of the collector/distribution assembly 437, respectively. In this embodiment, the air stream selector device 440 comprises a first side wall 490, a second side wall 491, and a shaped diverter 442 positioned between the two side walls, said shaped diverter sized to, in one orientation, prevent the collection of a product in the right loading zone (as shown in FIG. 5A) and, in the opposite orientation, prevent the collection of a product in the left loading zone.

With further reference to FIG. 5A, in this embodiment, the air stream selector device 440 further comprises a substantially tubular cavity 492 having a diameter of similar or same dimensions as the inner diameter of pneumatic conveying line 486 (or pneumatic conveying line 488 if attached in the opposite orientation), to allow a second product (or air) to be dispensed from a second product tank which has its own collector/distribution assembly attached thereto through pneumatic conveying line 486. The shaped diverter 442 is shaped so that it forms a valley 493 opposite cavity 492. This allows product being dispensed from collector/distribution assembly 437 to flow more readily to and through the corresponding pneumatic conveying line and therefore there is less chance of product accumulating in corners or crevices.

In this embodiment, air stream selector device 440 further comprises four curved extensions or lips; lips 498a/498b fitted to the right side at the rear and front of cavity 492, respectively, and lips 499a/499b fitted to the left side at the rear and front of the valley 493, respectively. Thus, when the air stream selector device is attached to the bottom of collector/distribution assembly 437, lips 494a, 494b line up with lips 498a and 498b to form jutting small cylinders to which a connector 472 can be attached. Thus, right pneumatic conveying line 488 can be attached to the assembled collector/distribution assembly 437 and air stream selector device 440 via connector 472. Similarly, lips 495a, 495b line up with lips 499a and 499b to form jutting small cylinders to which a connector 470 can be attached. Thus, left pneumatic conveying line 486 can be attached to the assembled collector/distribution assembly 437 and air stream selector device 440 via connector 472.

In the orientation shown in FIG. 5A, when the air stream selector device 442 fitted to the bottom 468 of collector/distribution assembly 437, the right loading zone 452 is blocked and therefore product in collector/distribution assembly 437 is prevented from being carried through the corresponding right pneumatic conveying line 488. Instead, product is directed to the left loading zone 450 to be carried through left pneumatic conveying line 486. In the reverse orientation (not shown) air stream selector device 440 fits onto the bottom of collector/distribution assembly 437 such that the left loading zone 450 is blocked and therefore product in collector/distribution assembly 437 is prevented from being carried through the corresponding left pneumatic conveying line 486. Instead, product is directed to the right loading zone 452 to be carried through right pneumatic conveying line 488.

By way of example, in one operation, with reference to FIG. 1, it may be desirable to deposit both seed and fertilizer in a single pass. Thus, compartment 96 may be loaded with seed. In this example, it may be desirable to have the seed directed by an air stream through left pneumatic conveying line 86. For this to occur, an air stream selector device of the present invention is positioned in collector/distribution assembly 37a such that seed cannot travel through the right pneumatic conveying line 88 (see FIG. 3 where right pneumatic conveying line 388 is "blocked" from receiving seed by shaped diverter 342 of air stream selector device 340). Left pneumatic conveyer line 86 can then be connected to a secondary distribution manifold mounted on the seeding tool (not illustrated). Further, compartment 98 may be loaded with fertilizer. Thus, it would be desirable to have the fertilizer directed by an air stream through right pneumatic conveying line 88. For this to occur, an air stream selector device is positioned in collector/distribution assembly 37b such that fertilizer cannot travel through the left pneumatic conveying line 86 (see FIG. 4 where left pneumatic conveying line 386 is "blocked" from receiving fertilizer by shaped diverter 342 of air stream selector device 340). Right pneumatic conveyer line 88 can then be connected to a secondary distribution manifold mounted on the fertilizing tool (not illustrated).

The ability to direct material from any compartment or tank through different pneumatic conveyer lines can greatly enhance the efficiency with which individual compartments can be used. For example, an operator may want to use a larger compartment for seeds in one application, while, in another application, this compartment could be used to hold fertilizer. In this manner, a specific compartment is not limited to a specific air stream.

While the invention has been described in conjunction with the disclosed embodiments, it will be understood that the invention is not intended to be limited to these embodiments. On the contrary, the invention is intended to cover alternatives, modifications and equivalents, which may be included within the spirit and scope of the invention. Various modifications will remain readily apparent to those skilled in the art, since the generic principles of the present invention have been defined herein specifically to describe air seeding systems.

We claim:

1. An air stream selector device for use in a collector/distribution assembly, the collector/distribution assembling having at least one section, each section having an open top and an open bottom and a pair of side by side loading zones, a left loading zone and a right loading zone along a first direction, and each section operable to receive a product from a product supply tank in a second direction perpendicular to the first direction through the open top into the left loading zone and the right loading zone and distribute the product to an air seeder in a third direction perpendicular to both the first and second directions; the air stream selector device comprising:
   a first side wall, a second side wall, an open top and a closed bottom;
   a shaped diverter fixed between the first and second side walls; and
   the air stream selector device being modular to fit into an individual section to seal the open bottom of the individual section and prevent product from collecting in either the right loading zone or the left loading zone of the individual section;
   whereby when the air stream selector device is fitted into the individual section in a first orientation, it prevents product from collecting in the right loading zone and allows product to collect in the left loading zone and when the air stream selector device is fitted into the individual section in a second orientation, it prevents product from collecting in the left loading zone and allows product to collect in the right loading zone.

2. The air stream selector device as claimed in claim 1, wherein the shaped diverter comprises a substantially U-shaped valley at the first side wall and curved upward slope at the second side wall.

3. The air stream selector device as claimed in claim 2, further comprising a substantially tubular cavity positioned below the curved upward slope.

4. The air stream selector device as claimed in claim 3, the right loading zone of each section having a right pneumatic conveying line, and the left loading zone of each section having a left pneumatic conveying line, whereby when the air stream selector device is fitted into the individual section in the first orientation the substantially U-shaped valley lines up with the left pneumatic conveying line and the substantially tubular cavity lines up with the right pneumatic conveying line.

5. The air stream selector device as claimed in claim 1, wherein the device is a substantially unitary body.

6. An air stream selector assembly comprising a plurality of air stream selector devices as claimed in claim 1, whereby the plurality of air stream selector devices are operably attached to one another.

7. The air stream selector assembly as claimed in claim 6, whereby the plurality of air stream selector devices are operably attached to one another by means of a clean out floor.

8. The air stream selector device as claimed in claim 3, the right loading zone of each section having a right pneumatic conveying line and the left loading zone of each section having a left pneumatic conveying line, whereby when the air stream selector device is fitted into the individual section in the second orientation the substantially U-shaped valley lines up with the right pneumatic conveying line and the substantially tubular cavity lines up with the left pneumatic conveying line.

\* \* \* \* \*